United States Patent
Amada et al.

(10) Patent No.: US 8,270,053 B2
(45) Date of Patent: Sep. 18, 2012

(54) HOLDING MECHANISM FOR LONG LENGTH OPTICAL ELEMENT, OPTICAL SCANNING DEVICE, AND IMAGE FORMING DEVICE

(75) Inventors: Taku Amada, Yamato (JP); Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 593 days.

(21) Appl. No.: 12/230,015

(22) Filed: Aug. 21, 2008

(65) Prior Publication Data
US 2009/0059335 A1 Mar. 5, 2009

(30) Foreign Application Priority Data
Aug. 27, 2007 (JP) .................... 2007-219472

(51) Int. Cl.
*G02B 7/02* (2006.01)
(52) U.S. Cl. .............. 359/205.1; 359/206.1; 359/818; 359/822; 347/242; 347/257
(58) Field of Classification Search ............ 359/202.1, 359/205.1, 206.1, 809, 811, 813, 818, 819, 359/822; 347/234, 241, 242, 245, 256, 257
See application file for complete search history.

(56) References Cited

U.S. PATENT DOCUMENTS

| | | | |
|---|---|---|---|
| 5,233,454 A | 8/1993 | Sakuma et al. | |
| 5,355,244 A | 10/1994 | Suzuki et al. | |
| 5,408,095 A | 4/1995 | Atsuumi et al. | |
| 5,426,298 A | 6/1995 | Sakuma et al. | |
| 5,459,601 A | 10/1995 | Suzuki et al. | |
| 5,475,522 A | 12/1995 | Itabashi et al. | |
| 5,504,613 A | 4/1996 | Itabashi et al. | |
| 5,606,181 A | 2/1997 | Sakuma et al. | |
| 5,684,618 A | 11/1997 | Atsuumi | |
| 5,889,606 A * | 3/1999 | Toyoda | 359/215.1 |
| 5,952,649 A | 9/1999 | Amada | |
| 6,078,419 A | 6/2000 | Atsuumi | |
| 6,198,563 B1 | 3/2001 | Atsuumi | |
| 6,388,792 B1 | 5/2002 | Atsuumi et al. | |
| 6,411,325 B1 * | 6/2002 | Matsushita et al. | 347/257 |
| 6,417,509 B1 | 7/2002 | Atsuumi et al. | |
| 6,448,998 B1 | 9/2002 | Suzuki et al. | |
| 6,509,995 B1 | 1/2003 | Suzuki et al. | |
| 6,596,985 B2 | 7/2003 | Sakai et al. | |
| 6,606,179 B2 | 8/2003 | Suzuki et al. | |
| 6,621,512 B2 | 9/2003 | Nakajima et al. | |
| 6,697,183 B2 | 2/2004 | Atsuumi et al. | |

(Continued)

FOREIGN PATENT DOCUMENTS

JP 2001-166235 6/2001

(Continued)

*Primary Examiner* — Frank Font
(74) *Attorney, Agent, or Firm* — Dickstein Shapiro LLP

(57) ABSTRACT

A holding mechanism for a long length optical element, which extends in a main scanning direction that is a movement direction of a deflected luminous flux by an optical deflector, and leads the deflected luminous flux to a scanned surface, includes; a holding member which is placed in a sub-scanning direction orthogonal to the main scanning direction and holds the long length optical element in at least two places. The holding member has, an adjusting section which deflects the long length optical element in the sub-scanning direction and controls a tilt of the long length optical element in a sub-scanning cross-section and/or occurrences of a tilt distribution in a longitudinal direction in the sub-scanning cross-section.

7 Claims, 15 Drawing Sheets

U.S. PATENT DOCUMENTS

| | | |
|---|---|---|
| 6,771,300 B2 | 8/2004 | Amada et al. |
| 6,771,407 B2 | 8/2004 | Hayashi et al. |
| 6,781,729 B2 | 8/2004 | Suzuki et al. |
| 6,785,028 B1 | 8/2004 | Atsuumi et al. |
| 6,791,729 B2 | 9/2004 | Atsuumi et al. |
| 6,800,845 B2 | 10/2004 | Sakai et al. |
| 6,801,351 B2 | 10/2004 | Suzuki et al. |
| 6,829,104 B2 | 12/2004 | Suzuki et al. |
| 6,937,371 B2 | 8/2005 | Hayashi et al. |
| 6,961,164 B2 | 11/2005 | Atsuumi |
| 6,999,208 B2 | 2/2006 | Suzuki et al. |
| 7,006,120 B2 | 2/2006 | Sakai et al. |
| 7,012,724 B2 | 3/2006 | Atsuumi et al. |
| 7,038,822 B2 | 5/2006 | Sakai et al. |
| 7,050,082 B2 | 5/2006 | Suzuki et al. |
| 7,050,210 B2 | 5/2006 | Atsuumi et al. |
| 7,068,407 B2 | 6/2006 | Sakai et al. |
| 7,106,483 B2 | 9/2006 | Hayashi et al. |
| 7,126,737 B2 | 10/2006 | Atsuumi et al. |
| 7,145,589 B2 | 12/2006 | Amada et al. |
| 7,154,651 B2 | 12/2006 | Atsuumi et al. |
| 7,161,724 B1 * | 1/2007 | Miyatake .................. 359/204.1 |
| 7,164,516 B2 | 1/2007 | Hayashi et al. |
| 7,206,014 B2 | 4/2007 | Amada et al. |
| 7,215,354 B1 | 5/2007 | Sakai et al. |
| 7,236,281 B2 | 6/2007 | Hayashi et al. |
| 7,271,823 B2 | 9/2007 | Izumi et al. |
| 7,277,212 B2 * | 10/2007 | Miyatake et al. .......... 359/220.1 |
| 7,298,537 B2 | 11/2007 | Hayashi |
| 7,301,554 B2 * | 11/2007 | Kubo ............................ 347/244 |
| 7,333,254 B2 | 2/2008 | Amada et al. |
| 7,397,591 B2 | 7/2008 | Hayashi et al. |
| 7,403,316 B2 | 7/2008 | Amada |
| 7,684,100 B2 * | 3/2010 | Amada ...................... 359/224.1 |
| 2004/0036936 A1 | 2/2004 | Nakajima et al. |
| 2005/0024479 A1 | 2/2005 | Itabashi et al. |
| 2005/0122557 A1 * | 6/2005 | Suzuki et al. ................. 359/205 |
| 2005/0280884 A1 | 12/2005 | Atsuumi et al. |
| 2006/0132880 A1 | 6/2006 | Amada et al. |
| 2006/0209166 A1 | 9/2006 | Suzuki et al. |
| 2006/0232660 A1 | 10/2006 | Nakajima et al. |
| 2006/0238845 A1 | 10/2006 | Atsuumi et al. |
| 2007/0081152 A1 | 4/2007 | Amada |
| 2007/0097474 A1 | 5/2007 | Amada et al. |
| 2007/0189008 A1 | 8/2007 | Amada et al. |
| 2007/0206261 A1 | 9/2007 | Hayashi et al. |
| 2008/0069585 A1 | 3/2008 | Amada |
| 2008/0204852 A1 | 8/2008 | Amada et al. |

FOREIGN PATENT DOCUMENTS

| | | |
|---|---|---|
| JP | 3569412 | 6/2004 |
| JP | 2006-323356 | 11/2006 |
| JP | 3913979 | 2/2007 |

* cited by examiner

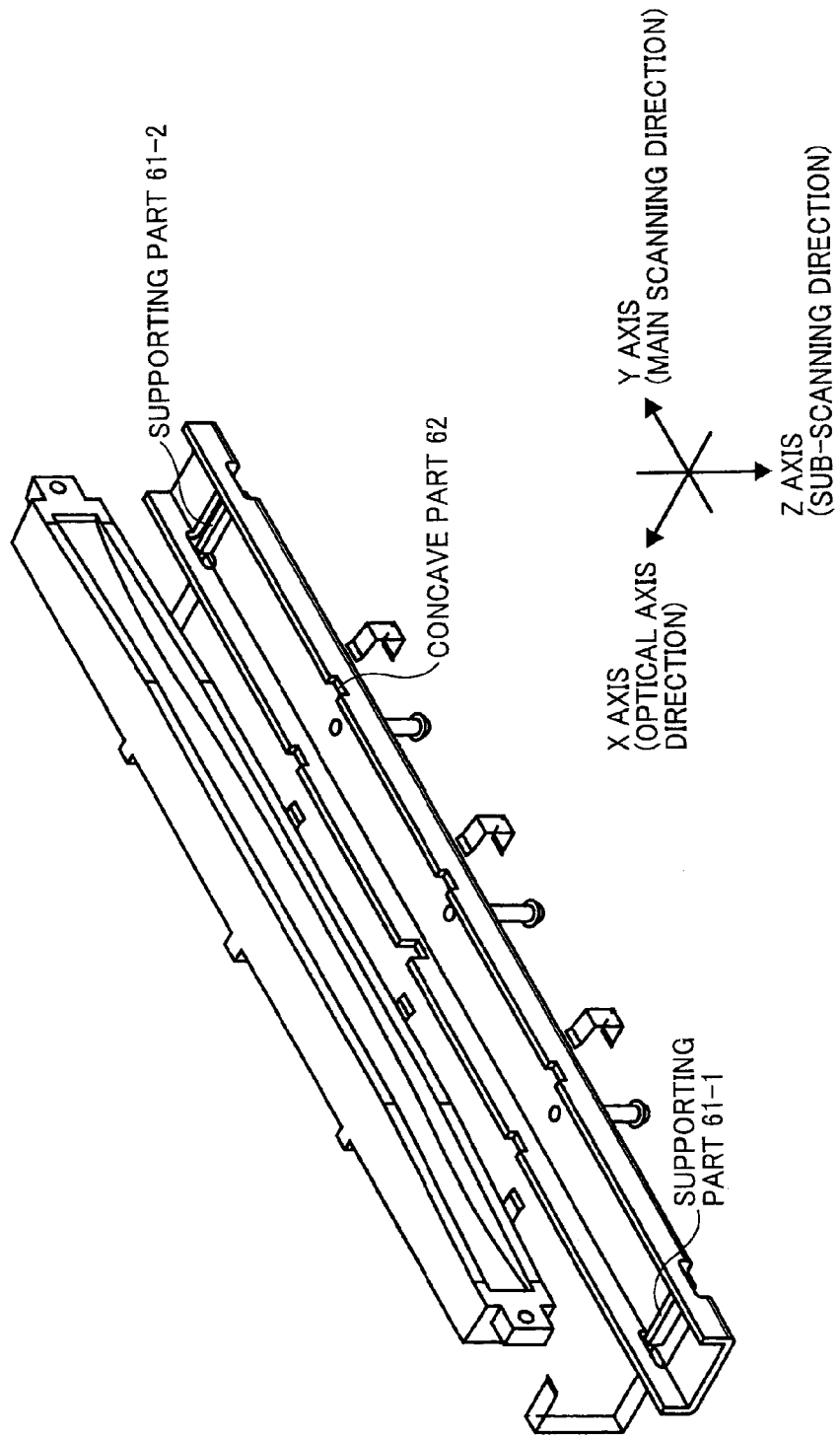

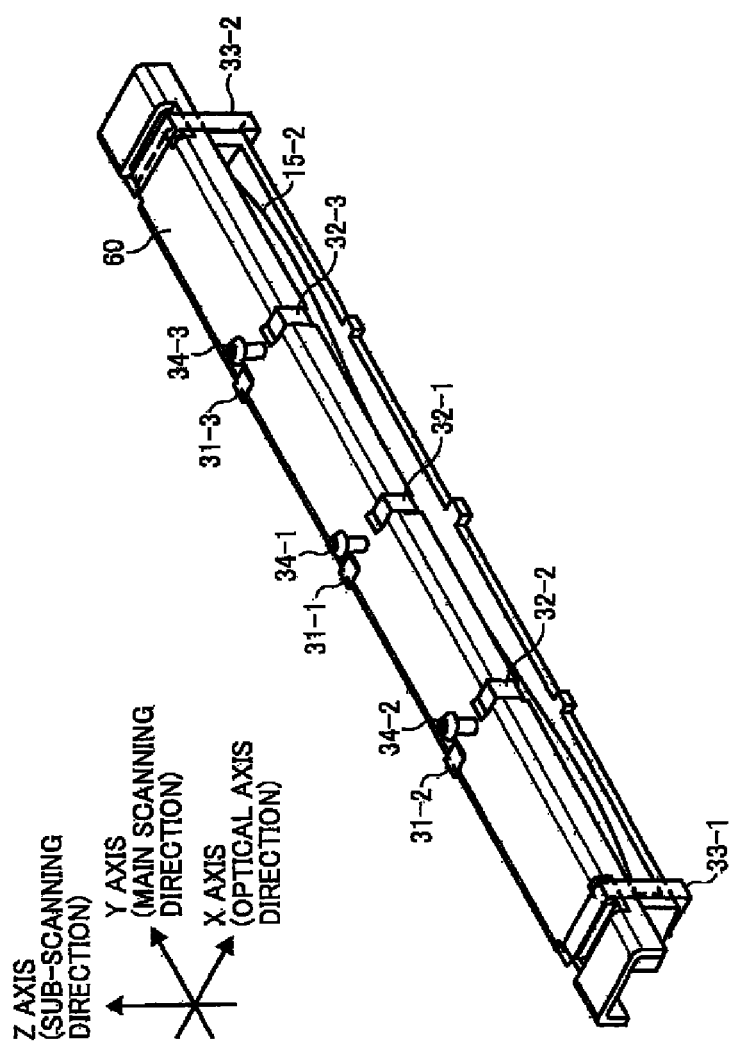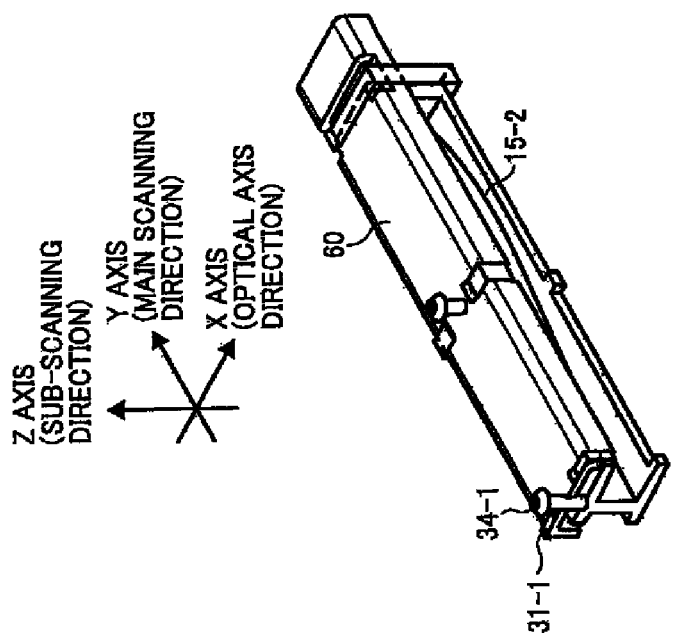

STRUCTURE OF PRESENT INVENTION

STRUCTURE OF COMPARATIVE EXAMPLE

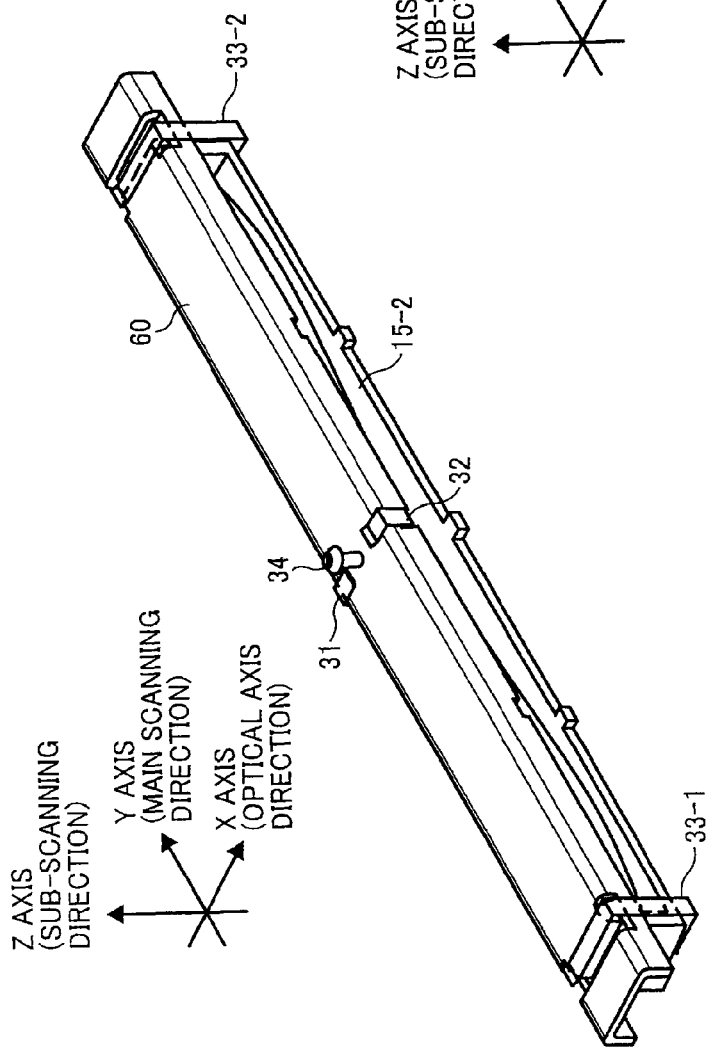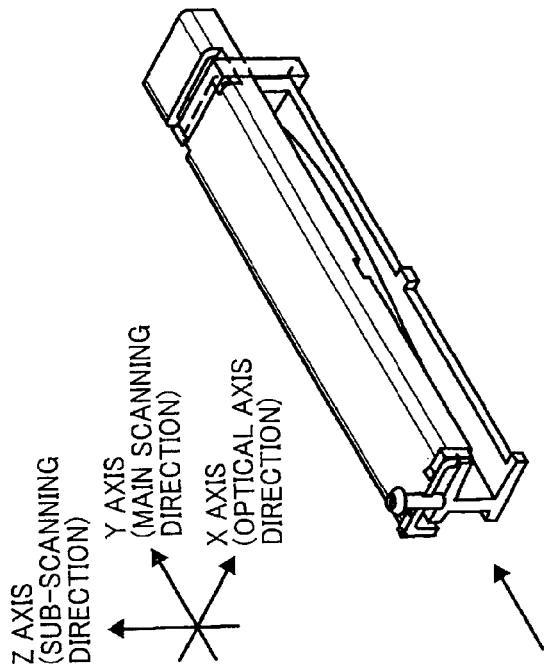

D1=D0
E1=E0

P1>P0
Q1<Q0
(P1+Q1=P0+Q0)

R1=R0

D2>D0
E2=E0

P2=P0
Q2=Q0
R2=R0

A1=A0
B1=B0
C1=C0
X1=X0
Y1<Y0

A2=A0
B2<B0
C2=C0
X2=X0
Y2=Y0

A3=A0
B3=B0
C3<C0
X3=X0
Y3=Y0

HOLDING MECHANISM FOR LONG LENGTH OPTICAL ELEMENT, OPTICAL SCANNING DEVICE, AND IMAGE FORMING DEVICE

CROSS REFERENCE TO RELATED APPLICATIONS

The present application is based on and claims priority from Japanese Patent Application Number 2007-219472, filed on Aug. 27, 2007, the disclosure of which is hereby incorporated by reference here in its entirety.

BACKGROUND

The present invention relates to an image forming device such as a copier, a printer and the like by use of an electrophotographic process, an optical scanning device incorporated in the image forming device, and a holding mechanism for a long length optical element incorporated in the optical scanning device and the like.

An optical scanning device incorporated in an image forming device is structured to deflect a luminous flux emitted from a light source by an optical deflector, lead a deflected luminous flux to a scanned surface via a scanning optical system and scan on the scanning surface. The deflected luminous flux is modulated by an image signal, and then a surface of a photoreceptor which is evenly charged is scanned by a modulated luminous flux. And thereby, a latent image corresponding to the image signal is formed on the surface of the photoreceptor. This forming process of the latent image is equivalent to an exposure process of electrophotographic processes. Subsequently, via a developing process, a transferring process, and a fixing process, an image is formed on, for example, paper having a sheet shape.

The scanning optical system of the optical scanning device leads a luminous flux which is deflected with a constant angular velocity by an optical deflector to a scanned surface, and has an fθ characteristic to scan at a constant angular velocity on the scanned surface and a function to converge a luminous flux on the scanned surface. The scanning optical system, in a whole deflected range of the deflected luminous flux by the optical deflector, in order to take full advantage of the fθ characteristic and a convergence function, comprises a long length optical element which is long in a scanning direction. Hereinafter, a main scanning direction is taken as a movement direction of a deflected luminous flux by an optical deflector and a sub-scanning direction is taken as a direction which is orthogonal to the main scanning direction. The long length scanning element is long in the main scanning direction.

In recent years, plastic material has been used in an optical element of a scanning optical system. Plastic is excellent for use in mass production, but on the other hand, plastic optical elements of scanning systems having undesired shapes are often formed. This is because an uneven temperature distribution occurs in a mold when forming, a cooling process is not performed evenly after removing from the mold and so on. As for an optical element used in a scanning optical system, in particular, as for an optical element placed between an optical deflector and a scanned surface, the long length optical element described above is used in many cases. However, the long length optical element may curve in the sub-scanning direction, and a shift of a scanning position to a direction corresponding to sub-scanning such as a tilt of a scanning line, a curve of the scanning line and so on occur depending on a holding structure. In addition, an error in mounting an optical element on a housing also causes the shift of the scanning position to the direction corresponding to sub-scanning, which may often be of a size that can not be ignored.

Moreover, in an image forming device having a plurality of scanning sections and a plurality of photoreceptors corresponding to each of the plurality of scanning sections, an amount of the shift of the scanning position to the direction corresponding to sub-scanning such as the curve of the scanning line and so on per scanning section may be different due to a temperature deviation among housings which hold and fix each of the plurality of scanning sections. Also, in a system in which a plurality of light beams are emitted into a single optical deflector and scanned, and an optical element is superposed on the sub-scanning direction and placed, that is, in a system in which all scanning sections are held in a same optical housing, the shift of the scanning position to the direction corresponding to sub-scanning such as the tilt of the scanning line, the curve of the scanning line and the like on each photoreceptor per scanning section may be different due to errors in the shape and mounting of the scanning optical system and the influence of the uneven temperature distribution in the same optical housing.

In a tandem-type full-color copier, four photoreceptor drums respectively corresponding to cyan (C), magenta (M), yellow (Y) and black (K) colors are disposed in a row along a carrier surface of a transfer belt. Optical scanning devices are placed corresponding to each of the four photoreceptor drums. A luminous flux is scanned by each of the optical scanning devices, and electrostatic latent images are formed on a circumferential surface of each of the four photoreceptor drums, and these electrostatic latent images are developed by toners corresponding to colors, and a developed images are transferred sequentially on a sheet carried by the transfer belt and then multi-color images are formed. Accordingly, if the shift of the scanning position in the direction corresponding to sub-scanning occurs per the optical scanning device corresponding to each color, degradation of image quality, a color shift and the like are caused.

There have been proposed various holding mechanisms for long length optical elements in order to avoid the possibilities of problems occurring in the optical scanning device and the image forming device described above.

The invention disclosed in Japanese patent No. 3913979 is one of the above, and relates to an optical scanning device having a holding mechanism provided with a curve of a scanning line adjusting section which adjusts a curve of a scanning line on a scanned surface by forcibly deflecting an optical element held by a holding member in a sub-scanning direction. Japanese patent No. 3913979 discloses that a plurality of the adjusting sections which forcibly deflect the optical element is placed in the holding member, however, controlling of a tilt of the optical element itself in a sub-scanning cross-section is not described. Japanese patent publication No. 2001-166235 also discloses that a scanning optical device which is structured similarly to that as described above.

Japanese patent No. 3569412 discloses that an optical scanning device comprises a plastic lens which extends in a main scanning direction and a curve adjusting section which deflects forcibly the plastic lens in a sub-scanning direction, and a curve adjusting section is integrally provided with the plastic lens. However, also in Japanese patent No. 3569412, controlling of the tilt of the optical element itself in the sub-scanning cross-section is not mentioned.

Japanese patent publication No. 2006-323356 discloses a scanning optical system, an optical scanning device and an image forming device which correct a complicated curve of a scanning line (symmetric W or M shapes) to make a scanning lens deform in a twisted state in a sub-scanning cross-section by a pressing section provided in a center of the scanning lens. In the invention disclosed in Japanese patent publication No. 2006-323356, a precondition is that the curve of the scanning line which is correctable is symmetric, so that the curve of the scanning line which is not symmetric can not be corrected with high precision.

Many inventions such as Japanese patent numbers 3913979 and 3569412 and Japanese patent publication numbers 2001-166235 and 2006-323356 have been proposed to avoid the possibilities of the problems described above.

For example, Japanese patent No. 3569412 and Japanese patent publication No. 2006-323356 disclose that a shape of the scanning line of the scanned surface is corrected to make the long length optical element having a power at least in the sub-scanning direction deform in a deflected state by use of an adjusting section. However, the adjusting section having only a single structure is disclosed in the inventions above. Accordingly, it is possible to correct the curve of the scanning line which is symmetric, but it is not possible to correct the curve of the scanning line which is not symmetric with high precision.

On the other hand, it is possible for the inventions disclosed in Japanese patent No. 3913979 and Japanese patent publication No. 2001-166235, which have a plurality of adjusting sections, to correct the curve of the scanning line which is not symmetric. However, Japanese patent No. Japanese patent No. 3913979 and Japanese patent publication No. 2001-166235, do not disclose that occurrences of a tilt distribution in a longitudinal direction in the sub-scanning cross-section of long length optical elements such as a scanning lens, a scanning mirror, a cylindrical lens and the like (this is called "a twisted deformation") are controlled. The adjusting section of the long length optical element disclosed in Japanese patent No. 36913979 and Japanese patent publication No. 2001-166235 adopts a structure such that "a pressing section" such as an adjusting screw and so on presses one of an upper surface or a lower surface of the long length optical element and "a spring section" such as a flat spring, a compression spring and so on which opposes the pressing force act on another surface of the long length optical element. The adjusting section as described above is provided and deforms the long length optical elements in a deflected manner, so that the shape of the scanning line on the scanned surface can be corrected.

However, in a case where long length optical elements are those having a power at least in a main scanning direction, such as a scanning lens, a scanning mirror, and so on, a cross-section in the longitudinal direction is not always uniform. Therefore, there is a possibility of a twisted deformation occurring (the tilt distribution in the longitudinal direction in the sub-scanning cross-section) by an arrangement of the pressing section and the spring section. Compared with a case where only a deflected deformation occurs, in a case where the twisted deformation occurs, there is another possibility that a desired adjustment of the curve of the scanning line is not performed, because a curve of the scanning line is generated by the twisted deformation. In a case where an optical system from a deflector to a scanned surface is a magnifying optical system, an amount of the deflected deformation of the long length optical element is increased, and an amount of the curve of the scanning line on the scanned surface becomes large. For example, in a case where an adjusting screw with a 0.36 mm screw pitch is used as the pressing section in the adjusting section, an advancing distance is 10 μm when the adjusting screw rotates by 10 degrees. That is, the long length optical element deforms by 10 μm in the deflected manner, but on the other hand, in a case of the magnifying optical system, the amount of the deflected deformation (10 μm) is increased and a large curve of the scanning line occurs. That is to say, a resulting adjustment amount becomes large comparing to an adjustment amount of the adjusting screw. Here, when the deflected deformation and the (unintended) twisted deformation occur, a larger curve of the scanning line occurs, that is, an adjustment sensitivity becomes too high, and there is still another possibility that it is difficult to adjust with high precision using adjustment tools without a speed reducing mechanism such as an ordinary screwdriver and so on.

"The twisted deformation" described above, as illustrated in FIG. 14A, is a deformation when a rotational moment around a rotational axis (i.e. torque) which is approximately parallel to the longitudinal direction works, and it is also called "a torsional deformation". "The deflected deformation" described above, as illustrated in FIG. 14B, is a deformation when a shearing force in an orthogonal direction to the longitudinal direction works.

SUMMARY

An object of the present invention is to propose a holding mechanism for a long length optical element in which "a twisted deformation" does not occur, and to propose an optical scanning device and an image forming device in which the long length optical element is mounted.

According to an embodiment of the present invention, a holding mechanism for a long length optical element which extends in a main scanning direction that is a movement direction of a deflected luminous flux by an optical deflector, and leads the deflected luminous flux to a scanned surface, comprises; a holding member which is placed in a sub-scanning direction orthogonal to the main scanning direction and holds the long length optical element in at least two places, the holding member including; an adjusting section which deflects the long length optical element in the sub-scanning direction and controls a tilt of the long length optical element in a sub-scanning cross-section and/or occurrences of a tilt distribution in a longitudinal direction in the sub-scanning cross-section.

Preferably, the adjusting section comprises; at least one pressing section which presses the long length optical element in the sub-scanning direction, and at least one spring section resists a displacement by pressing of the pressing section.

Preferably, the holding member has a plurality of the pressing members, and the pressing members except for at least one of the plurality of the pressing members are placed on a straight line which extends along the main scanning direction.

Preferably, the spring section is respectively placed on both sides of the long length optical element in an optical axis direction, and a pressing force of the spring section which is placed on one side of the optical axis direction and a pressing force of the spring section which is placed on the other side are respectively different.

Preferably, the long length optical element is held near both ends thereof in the main scanning direction by the holding member.

According to another embodiment of the present invention, an optical scanning device, comprises: a light source section; an optical deflector which deflects a luminous flux emitted from the light source section; and a scanning optical system having a long length optical element and configured to lead a deflected luminous flux to a scanned surface, wherein the long length optical element is held by the holding mechanism described above.

According to still another embodiment of the present invention, an image forming device, which forms an image by performing electrophotographic processes including charging, exposure, developing, transferring, and fixing processes onto a photoreceptor drum, comprises: the optical scanning device described above as a device which performs the exposure process.

BRIEF DESCRIPTION OF THE DRAWINGS

FIG. 3B is an exploded perspective view of the holding mechanism for the long length optical element as seen from a bottom surface side according to the first embodiment of the present invention.

FIG. 4A is a perspective view of the holding mechanism for the long length optical element as seen from the top surface side according to the first embodiment of the present invention.

FIG. 4B is a perspective view of the holding mechanism for the long length optical element when cut at a center in a length direction and seen from the top surface side according to the first embodiment of the present invention.

FIG. 7A is an exploded perspective view of a holding mechanism for a long length optical element as seen from the top surface side according to a second embodiment of the present invention.

FIG. 7B is an exploded perspective view of the holding mechanism for the long length optical element when cut at the center in the length direction and seen from the top surface side according to the second embodiment of the present invention.

DETAILED DESCRIPTION OF THE PREFERRED EMBODIMENTS

Hereinafter, embodiments of a holding mechanism for a long length optical element, an optical scanning device and an image forming device according to the present invention will be explained with reference to drawings.

Firstly, general descriptions of an optical scanning device and a color image forming device using the optical scanning device will be explained.

Figure 1:
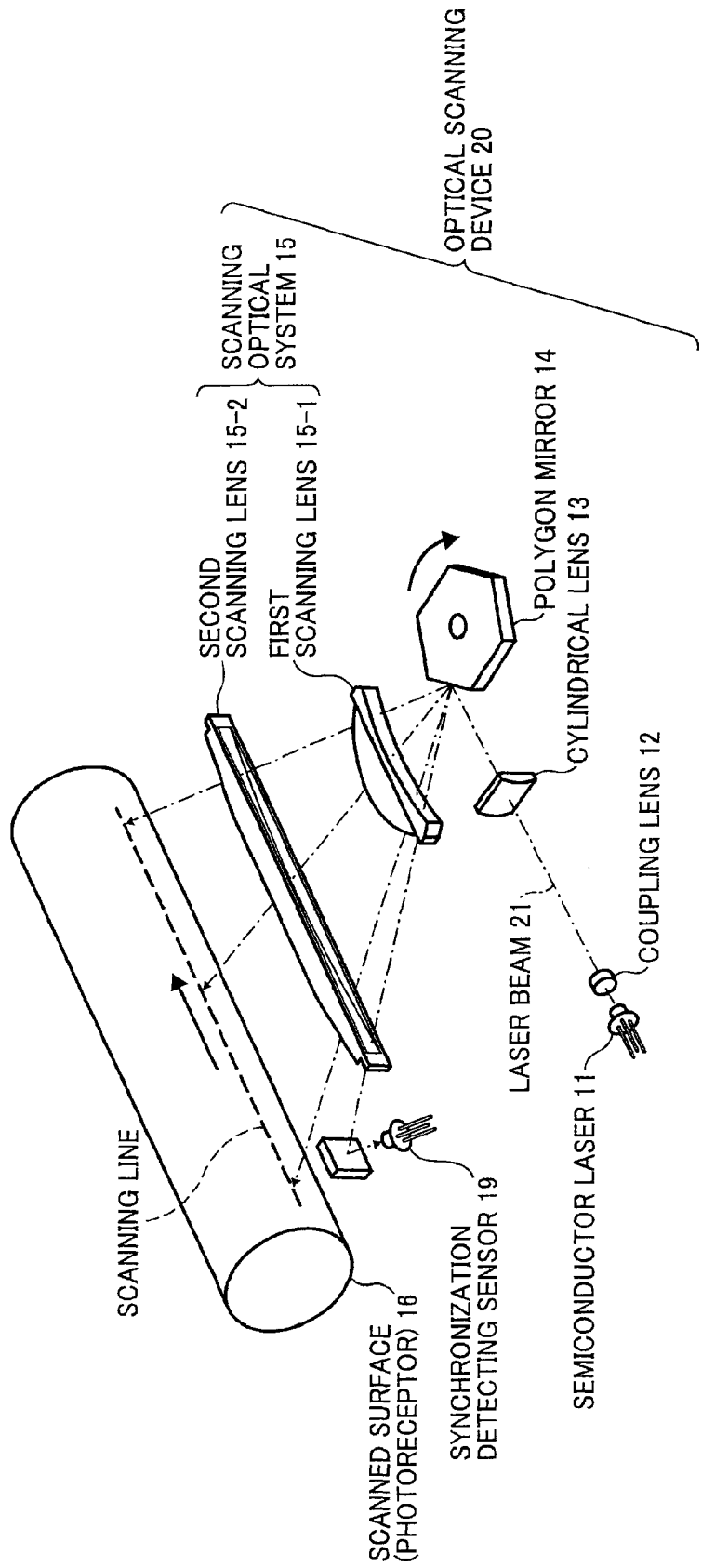
FIG. 1 is a perspective view of an embodiment of an optical scanning device which is applied to a holding mechanism for a long length optical element according to an embodiment of the present invention.

FIG. 1 illustrates an example of an optical scanning device. In FIG. 1, an optical scanning device 20 has a light source part, a polygon mirror 14 as an optical deflector, and a scanning optical system 15. The light source part has a semiconductor laser 11 which is a light source, a coupling lens 12, and a cylindrical lens 13. The coupling lens 12 converts a laser beam 21 emitted from the semiconductor laser 11 into a parallel luminous flux, a weak divergent luminous flux, a weak convergent luminous flux or the like, corresponding to the following optical system. A linear image, which is long in a main scanning direction and imaged in a sub-scanning direction, is formed in the neighborhood of a deflection reflecting surface of the polygon mirror 14, which is the optical deflector, by an action of the cylindrical lens 13.

The polygon mirror 14 is rotatably driven by a motor at a constant speed, and deflects the laser beam described above at a constant angular velocity. A deflected laser beam scans a scanned surface 16 via the scanning optical system 15 comprising a first scanning lens 15-1 and a second scanning lens 15-2. The scanned surface 16 actually is a surface of a photoreceptor drum (the numeral 16 also denotes the photoreceptor drum). The scanning optical system 15 has an fθ function and a function to converge the linear image described above formed on the deflection reflecting surface of the polygon mirror 14 on the scanned surface 16 as a light spot, so that a laser beam can scan the scanned surface 16 at the constant angular velocity.

Figure 2:
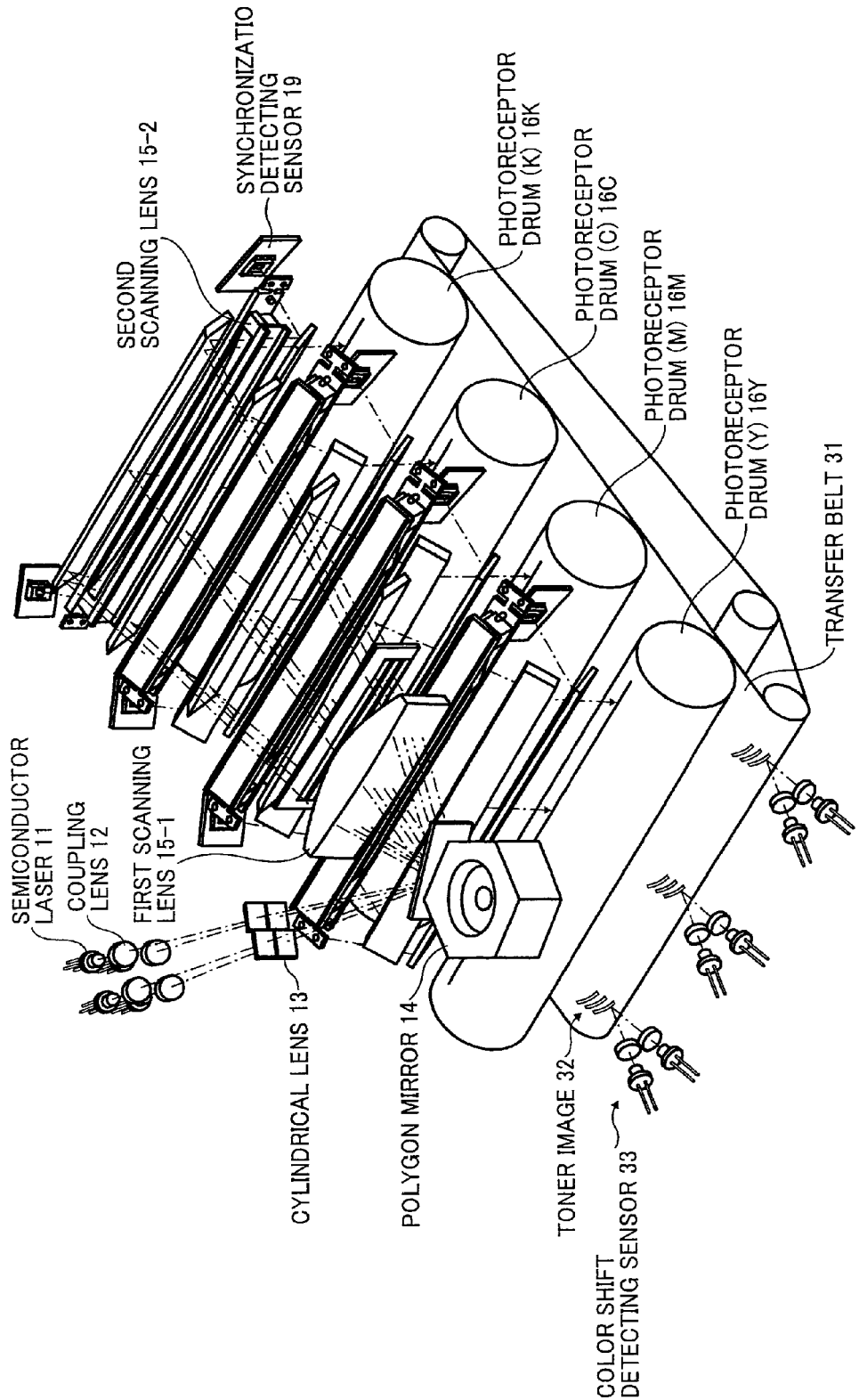
FIG. 2 is a perspective view of an embodiment of an image forming device which is applied to the optical scanning device according to an embodiment of the present invention.

FIG. 2 illustrates an example of a tandem-type color image forming device having four optical scanning devices (four-station optical system) described above. This image forming device has light sources comprising four semiconductor lasers 11. Each light source emits a laser beam modulated by image signals corresponding to each color, cyan (C), magenta (M), yellow (Y), and black (K). Laser beams emitted from each semiconductor laser 11 follow similar light paths to a case of the scanning optical system illustrated in FIG. 1, and each of the laser beams scans surfaces of different photoreceptor drums (C, M, Y and K). Here, the light source is not limited to a single-beam semiconductor leaser as illustrated in FIG. 2, and a semiconductor laser array having a plurality of light-emitting points and a configuration which compounds light beams from a plurality of light-emitting points may be applicable. Each photoreceptor drum 16 corresponds to toners of each color, cyan (C), magenta (M), yellow (Y), and black (B). Toner images developed by well-known electrophotographic processes are overlapped on a transfer belt 31, and then a full-color image is formed.

In the image forming device described above, in a case where a deviation occurs in a shape of a scanning line which scans the photoreceptor drums 16 corresponding to each station, a color shift occurs in an output image and there is a possibility that the quality of an output image, especially in a halftone image and the like, may be degraded.

In an image forming device, a scanning line, which is adjusted to a desired value or in a desired shape when assembling in a factory, in a place of a user or the like, is changed when using the image forming device. The influence of a heat generation by an optical deflector comprising a polygon mirror 14 is conceivable as a cause. Particularly, in a case where a material of an optical housing in which an optical element is stored is a material having a high heat conductivity such as metal typified by aluminum or zinc, a heat generated by a rotary drive of the optical deflector is conducted to the inside of an optical housing member (not illustrated) and reaches a first scanning lens 15-1. When the heat of the optical deflector is conducted to the first scanning lens 15-1, an uneven temperature distribution occurs inside of the first scanning lens 15-1 and this causes an occurrence of a curve of die scanning line. Especially in recent years, in order to respond to a request for speeding-up of an output speed, there is a tendency to increase the number of rotations of the optical deflector. Therefore, there is a high possibility of the occurrence of a curve of the scanning line described above.

To avoid such a problem described above, it is preferable that a power in the sub-scanning direction of the first scanning lens 15-1 should be zero. In a case of having a structure like this, the power in the sub-scanning direction is distributed to a second scanning lens 15-2. The second scanning lens 15-2, regarding heat conduction, is often placed relatively farther away from the optical deflector than the first scanning lens 15-1, and it is hard for a structure of the second scanning lens 15-2 to be influenced by heat generation of the optical deflector. Therefore, it is preferable that the power in the sub-canning line should be distributed to the second scanning lens 15-2 as described above.

In the optical scanning device, or the image forming device explained above, an embodiment of a holding device for a long length optical element in which "the twisted deformation" described above does not occur will be explained.

Embodiment 1

In FIGS. 3A to 5C, a scanning lens formed by a resin is illustrated as a typical example of "a long length optical element" having a long shape in the main scanning direction. However, a material of an optical element is not limited to a resin, and a glass material and so on can also be used as the material of the optical element. In addition, an optical element having "a long length shape" which is mainly placed in an optical path from the polygon mirror 14 to the scanned surface 16 can be applied to not only a scanning lens but also a scanning mirror, a turning back mirror and so on, instead of the scanning lens. "The long length shape" in this specification means a shape which is capable of a deflected deformation in an external force direction by an action of the external force.

Figure 3A:
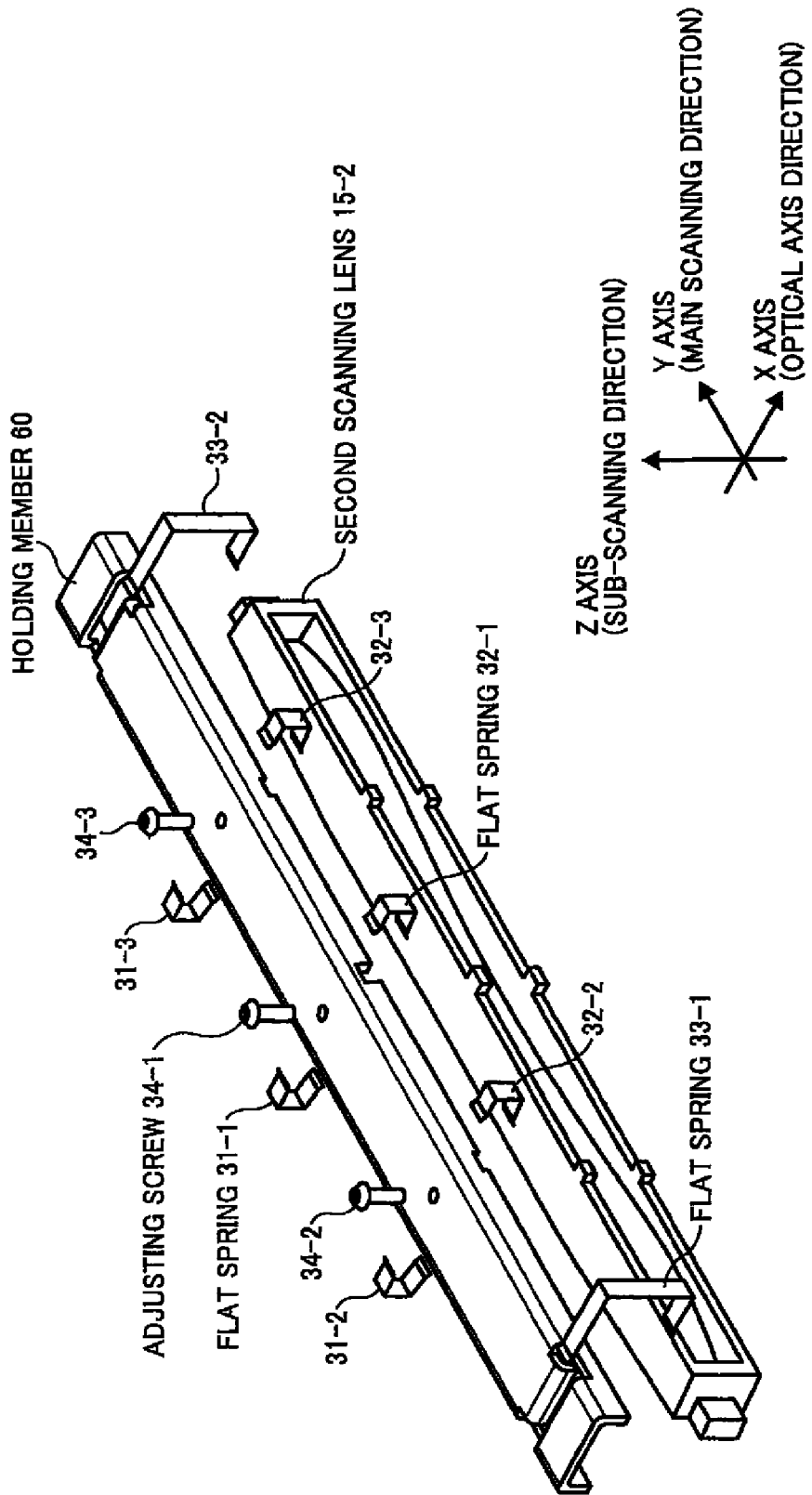
FIG. 3A is an exploded perspective view of the holding mechanism for the long length optical element as seen from a top surface side according to a first embodiment of the present invention.
Figure 5B:
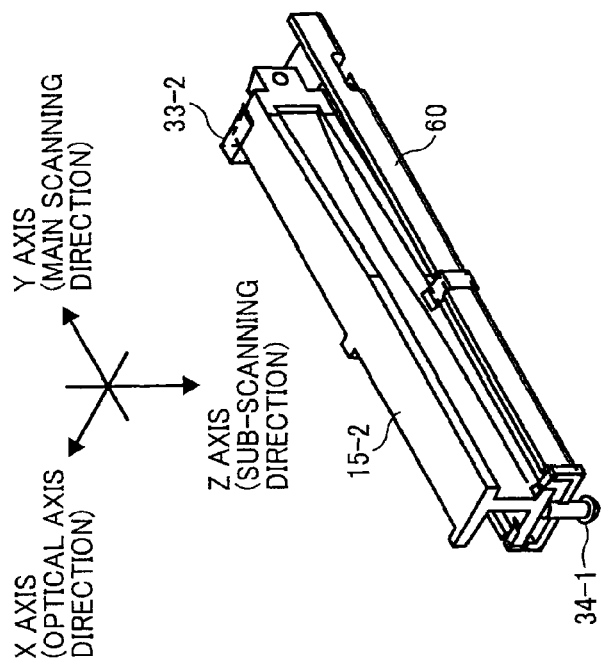
FIG. 5B is a perspective view of the holding mechanism for the long length optical element when cut at the center in the length direction and seen from the bottom surface side according to the first embodiment of the present invention.
Figure 5A:
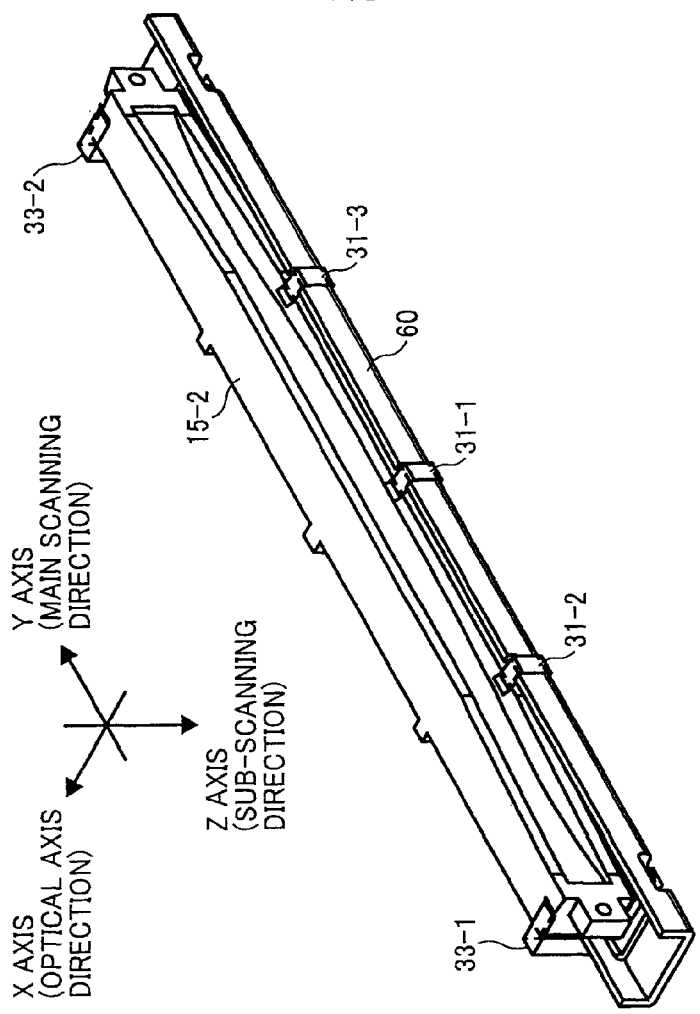
FIG. 5A is a perspective view of the holding mechanism for the long length optical element as seen from the bottom surface side according to the first embodiment of the present invention.
Figure 5C:
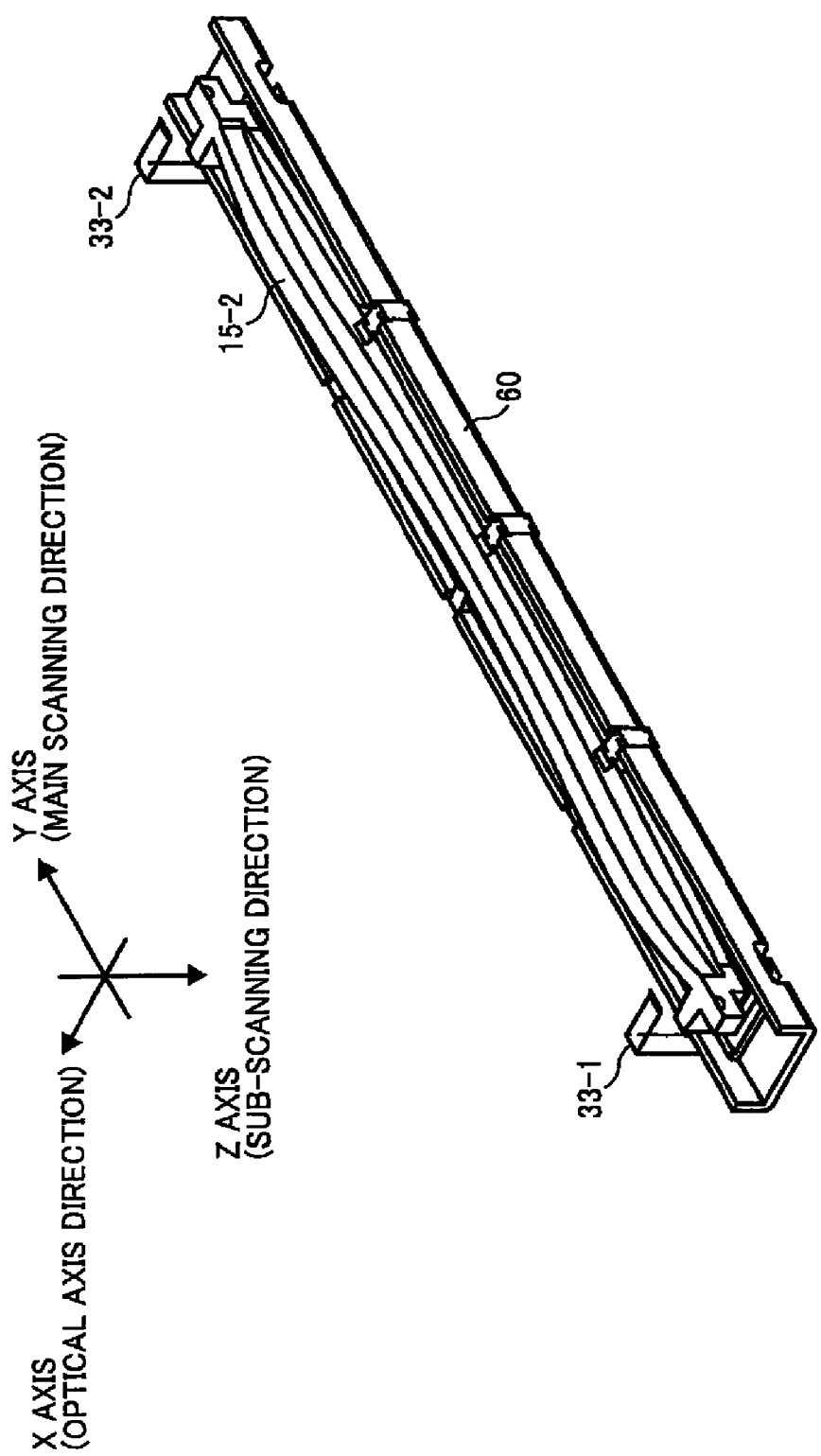
FIG. 5C is a perspective view of a part of the holding mechanism for the long length optical element when cut at a cutting surface in a longitudinal direction and seen from the bottom surface side according to the first embodiment of the present invention.

FIG. 3A is an exploded perspective view of the holding mechanism for the long length optical element as seen from a top surface side, and FIG. 3B is an exploded perspective view of the holding mechanism for the long length optical element as seen from a bottom surface side. FIG. 4A is a perspective view of the long length optical element holding mechanism as seen from the top surface side, and FIG. 4B is a perspective view of the holding mechanism for the long length optical element when cut at a center in a length direction and seen from the top surface side. FIG. 5A is a perspective view of the holding mechanism for the long length optical element as seen from the bottom surface side. FIG. 5B is a perspective view of the holding mechanism for the long length optical element when cut at the center in the length direction and seen from the bottom surface side. FIG. 5C is a perspective view of a part of the holding mechanism for the long length optical element when cut at a cutting surface in a longitudinal direction and seen from the bottom surface side.

In FIGS. 3A to 5C, the second scanning lens 15-2 is supported by supporting parts 61-1 and 61-2, which are provided in the vicinity of both ends in a longitudinal direction (a main scanning direction) of a holding member 60. The holding member 60 is formed in a groove shape by press working of sheet metal. The supporting parts 61-1 and 61-2 are formed by cutting and bending a bottom in a width direction of a groove in the vicinity of both ends in the longitudinal direction (the main scanning direction) of the holding member 60 from an external bottom surface side toward the inside of the groove. One surface of the second scanning lens 15-2 abuts on a sheared surface of cut-and-bent parts (the supporting parts) 61-1 and 61-2. Flat springs 33-1 and 33-2 as "a spring section" are arranged to hold the second scanning lens 15-2 and the holding member 60. The flat springs 33-1 and 33-2 are bent and formed in a horseshoe shape. The flat springs 33-1 and 33-2 are arranged to hold the second scanning lens 15-2 and the holding member 60 at positions corresponding to the supporting parts 61-1 and 61-2 of the holding member 60 and at positions of the second scanning lens 15-2 facing the positions corresponding to the supporting parts 61-1 and 61-2 of the holding member 60 from a lower surface side. The second scanning lens 15-2 is pressed and fixed on the holding member 60 by an elastic force of the flat springs 33-1 and 33-2.

Three screw holes are provided along the main scanning line in the holding member 60. Three adjusting screws 34-1, 34-2 and 34-3 as "a pressing member" are screwed respectively into each screw hole. Each end of the three adjusting screws 34-1, 34-2 and 34-3 abuts on one surface of the second scanning lens 15-2 (an upper surface in FIG. 3A). Each screwed position of the three adjusting screws 34-1, 34-2 and 34-3 is adjusted so that a partial shift amount to the sub-scanning direction of the second scanning lens 15-2 can be adjusted. Flat springs 31-1, 31-2 and 31-3 are equipped facing each screwed position of the three adjusting screws 34-1, 34-2 and 34-3. These flat springs 31-1, 31-2 and 31-3 are bent and formed in a horseshoe shape. One side of a flat spring is fitted into a concave part 62 formed in a side wall of the holding member 60 and hung on a rib in a visor shape of the second scanning lens 15-2, and the other side of the flat spring is hung on a surface corresponding to a bottom surface of the holding member 60.

The second scanning lens 15-2 integrally has the rib in the visor shape on front and back sides in an optical axis direction and at both ends in the sub-scanning direction (up-and-own direction in FIGS. 3A and 3B). The flat springs 31-1, 31-2 and 31-3 are hung on the rib in the visor shape on the front side in the optical axis direction of the second scanning lens 15-2. Also on the rib in the visor shape on the back side in the optical axis direction of the second scanning lens 15-2, one side of each of the flat springs 32-1, 32-2 and 32-3 is hung at each position corresponding to the three adjusting screws 34-1, 34-2 and 34-3, and the other side of each of the flat springs 31-1, 31-2 and 31-3 is hung on a surface corresponding to a bottom surface of the holding member 60. Therefore, the second scanning lens 15-2 is also attached to the holding member 60 by the flat springs 32-1, 32-2 and 32-3.

The three adjusting screws 34-1, 34-2 and 34-3 are respectively rotated in normal and reverse directions, and thereby, as for the second scanning lens 15-2, a relative position to the holding member 60 in corresponding parts of the three adjusting screws 34-1, 34-2 and 34-3 is adjusted and "a deflected shape" of the second scanning lens 15-2 is adjusted. As for the flat springs corresponding to each of the three adjusting screws 34-1, 34-2 and 34-3, pairs of the flat springs are equipped in a front surface side (an incident surface side) and in a back surface side (an emission surface side) of the second scanning lens 15-2. Accordingly, it is possible to stably hold a shape and a position of the second scanning lens 15-2.

Figure 8:
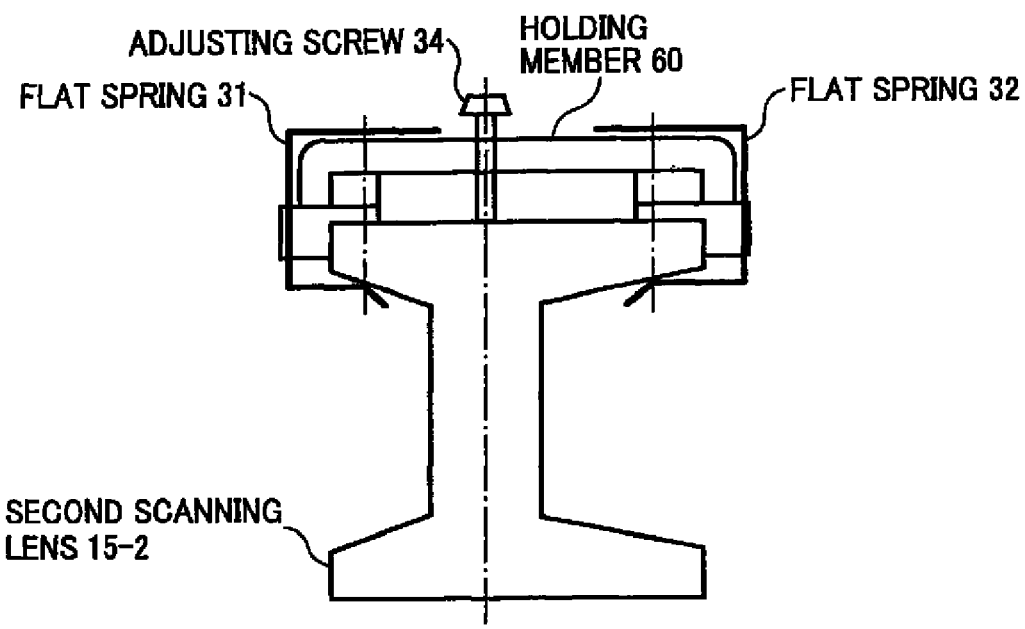
FIG. 8 is an enlarged cross-sectional view of the holding mechanism for the long length optical element at the center in the length direction according to the second embodiment of the present invention.
Figure 9:
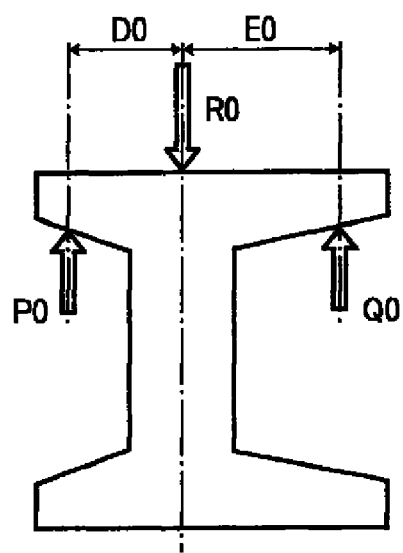
FIG. 9 is a schematic view illustrating an external force acting on the holding mechanism for the long length optical element at the center in the length direction described above.
Figure 15:
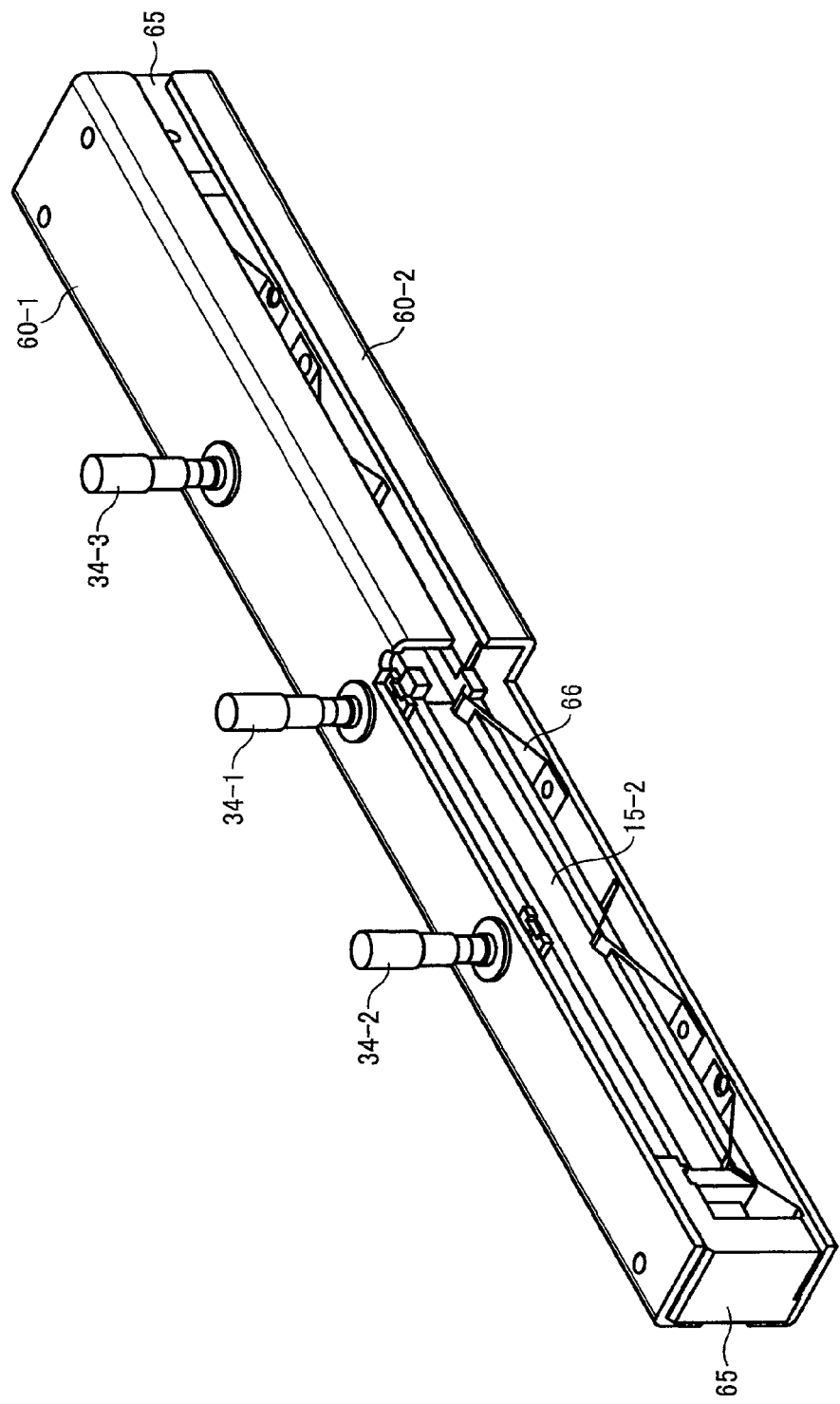
FIG. 15 is a perspective view of a holding mechanism for a long length optical element with a part cut out according to another embodiment of the present invention.

For example, the flat springs 31-1 to 31-3 and the flat springs 32-1 to 32-3 in the embodiment illustrated in FIGS. 3A to 5C as well as a flat spring 31 and a flat spring 32 as the spring section illustrated in FIG. 8 are separate parts respectively. However, if a structure which generates external forces P0 and Q0 illustrated in FIG. 9 is employed, those separate parts may be integrated parts. The holding member 60 is provided on only an upper side of the second scanning lens 15-2; however, for example, a structure of a holding member in which holding members are provided on the upper side and a lower side of the second scanning lens 15-2 as illustrated in FIG. 15 may be applicable. The structure of the holding member illustrated in FIG. 15 will be explained in detail. For example, the holding member illustrated in FIG. 15 has an upper holding member 60-1 and a lower holding member 60-2 which are made of sheet metal. The upper and lower holding members 60-1 and 60-2 are placed facing each other with spacers 65 in a block shape at both ends in the longitudinal direction in between the upper and lower holding members 60-1 and 60-2, and the second scanning lens 15-2 which is the long length optical element is placed between the upper and lower holding members 60-1 and 60-2. In one of the holding members, for example, in the upper holding member 60-1, the adjusting screws 34-1, 34-2 and 34-3 as three pressing members are placed in the longitudinal direction (the main scanning direction) at appropriate intervals. In the lower holding member 60-2, an biasing section comprising five flat springs 66 in total is placed in each position corresponding to the adjusting screws 34-1, 34-2, and 34-3 and positions near both ends in the length direction. An upper surface of the second scanning lens 15-2 is pressed on each end of the adjusting screws 34-1, 34-2 and 34-3 by a biasing force of each of the five flat springs 66, and each screwed position of the adjusting screws 34-1, 34-2 and 34-3 is adjusted. And thereby, it is possible to adjust "the deflected shape" of the second scanning lens 15-2.

Here, a structure part comprising an adjusting screw and a flat spring is called "an adjusting mechanism". As embodiments illustrated in FIGS. 3A to 5C, or in FIG. 15, in a structure in which the adjusting mechanism is provided in three places in the length direction of the long length optical element, that is, in a three-point adjusting mechanism, compared with a case of one-point adjusting mechanism as an embodiment illustrated in FIGS. 7A and 7B described later, a more complicated shape of a deflection of the long length optical element is adjusted, and thereby, it is possible to correct a shape of the scanning line. It is possible for the one-point adjusting mechanism to correct only parabola shapes such as a simple "protruding upward shape" or a simple "protruding downward shape". On the other hand, it is possible for the three-point adjusting mechanism to adjust shapes of the scanning line such as "S shape", "W shape", "M shape" and the like.

In the embodiment illustrated in FIGS. 3A to 5C, the supporting parts 61-1 and 61-2 are disposed in the vicinity of the both ends of the second scanning lens 15-2. By adopting a structure like this, in a region out of an effective area of the second scanning lens 15-2, the second scanning lens 15-2 is pressed and fixed on the holding member 60 from the lower surface side by the flat springs 32-1 and 32-2 and a deformation of a rib part in a visor shape of the second scanning lens 15-2 is avoided.

Embodiment 2

FIGS. 7A and 7B illustrate a holding mechanism for a long length optical element according to an embodiment 2 of the present invention. This embodiment is an example of a "one-point adjusting mechanism" comprising an adjusting mechanism in one place, in a holding mechanism which holds a second scanning lens 15-2 which is a long length optical element. A structure of the adjusting mechanism provided in one place is the same as the structure of the adjusting mechanism according to the embodiment 1. In FIGS. 7A and 7B, numeral 60 denotes a holding member, numeral 15-2 denotes a second scanning lens which is a long length optical element, numerals 33-1 and 33-2 denote flat springs by which the second scaring lens 15-2 is pressed on the holding member 60 at both ends in a length direction of the second scanning lens 15-2, numeral 34 denotes an adjusting screw, and numerals 31 and 32 denote flat springs which are provided corresponding to the adjusting screw 34, respectively.

FIG. 8, viewed from a direction of an arrow illustrated in FIG. 7B, is an enlarged view of a cross section at the center in the length direction of the holding mechanism for the long length optical element. Additionally, FIG. 9 illustrates an external force applied to the long length optical element in FIG. 8, that is, schematically illustrates an action of the adjusting screw 34 and the flat springs 31 and 32, and illustrates a state of a tentative assembly before the adjusting screws are pressed into, or are pulled out. In FIG. 9, pressing forces P0 and Q0 of the flat springs 31 and 32, a pressing force R0 of the adjusting screw 34, and an internal stress in the second scanning lens 15-2 (a deflection rigidity and a twist rigidity) are in a balanced state, and the second scanning lens is not in a "twisted deformation" state. Here, in a case where a deflected shape of the second scanning lens 15-2 is adjusted by pressing into and pulling out the adjusting screw 34, it is preferable to set the pressing forces P0 and Q0 and distances D0 and E0 so that the external force and the internal stress are not in the balanced state and the second scanning lens 15-2 is not in the twisted deformation state.

Figure 10A:
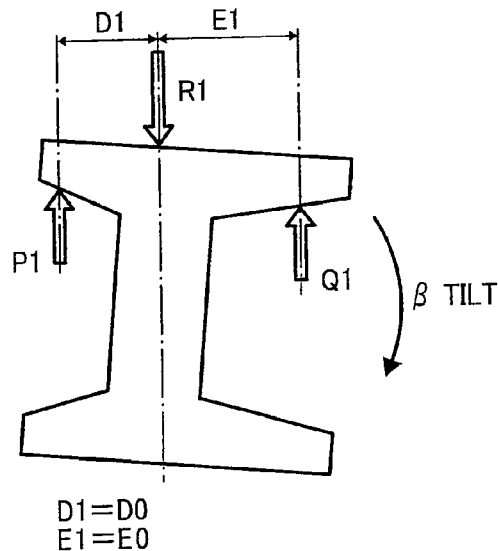
FIG. 10A is a schematic view explaining a case of an off-balance of an external force and an internal stress in the holding mechanism for the long length optical element, and illustrates that a pressing power Q1 is smaller than an ideal value Q0, a pressing power P1 is larger than an ideal value P0 and a twisted deformation occurs at the center of the long length optical element.
Figure 10B:
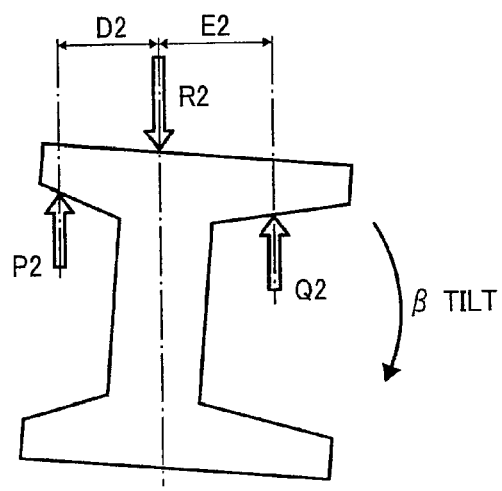
FIG. 10B is a schematic view explaining the case of the off-balance of the external force and the internal stress in the holding mechanism for the long length optical element, and illustrates a case where a distance D2 which is related to the external force to the long length optical element is longer than a predetermined value D0.
Figure 11A:
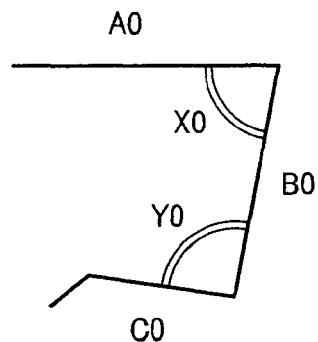
FIG. 11A is an example of side views illustrating various examples of flat springs which are applicable to an embodiment of the present invention, and illustrates a reference state.
Figure 11B:
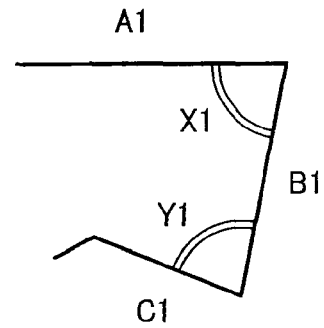
FIG. 11B is an example of side views illustrating various examples of flat springs which are applicable to an embodiment of the present invention, and illustrates a shape example of a flat spring which is applicable to the case illustrated in FIG. 10A.
Figure 11C:
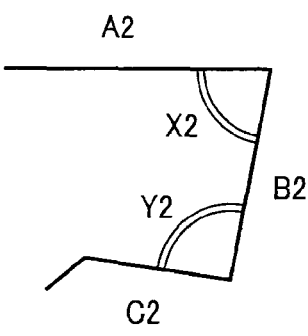
FIG. 11C is an example of side views illustrating various examples of flat springs which are applicable to an embodiment of the present invention, and illustrates a shape example of a flat spring which is applicable to the case illustrated in FIG. 10A, as well as FIG. 11B.
Figure 11D:
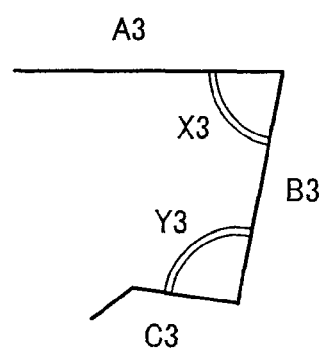
FIG. 11D is an example of side views illustrating various examples of flat springs which are applicable to an embodiment of the present invention, and illustrates a shape example of a flat spring which is applicable to the case illustrated in FIG. 10B.

To change pressing forces of the flat springs 32 and 31 corresponding to the adjusting screw 34, various shapes as illustrated in FIGS. 11A to 11D may be selected and designed. Here, FIG. 11A is taken as a reference. For example, as illustrated in FIG. 10A, if a pressing force Q1 is smaller than an ideal value and a deflected deformation in an arrow β direction at the center of the second scanning lens 15-2 occurs, shapes of the flat springs may be modified as in FIG. 11B or FIG. 11C so that the pressing force Q1 approaches the ideal value, that is, the pressing force Q1 becomes large. In addition, as illustrated in FIG. 10B, when a distance D2 is longer than a predetermined value, the shapes of the flat springs may be modified as in FIG. 11D. As another design to change the pressing forces of the flat springs, it is also possible to change a width (a width in the sub-scanning (a z axis) direction in FIGS. 7A and 7B) or a thickness of the flat springs, or to appropriately choose a material having a different physical property (stress-distortion characteristic).

Embodiment 3

Figure 6A:
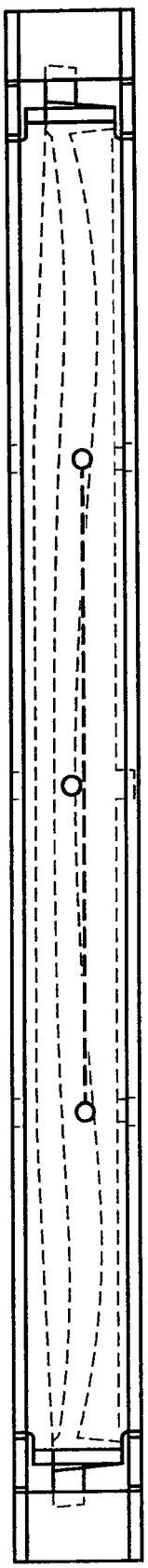
FIG. 6A illustrates an example of an arrangement of a three-point supporting mechanism of the holding mechanism for the long length optical element having the three-point supporting mechanism, and is a plain view according to an embodiment of the present invention.

In the embodiment 2, the holding mechanism for the long length optical element has the one-point adjusting mechanism; however as explained in the embodiment 1, a plurality of adjusting mechanisms may be provided. In a case where the plurality of adjusting mechanisms is provided, as an embodiment 3 illustrated in FIG. 6A, in accordance with a change along the main scanning direction of a cross-sectional shape of the second scanning lens 15-2, it is preferable that an arrangement of the plurality of adjusting screws 34 should be deviated from a straight line connecting with the plurality of adjusting screws 34. In this case, none of the plurality of adjusting screws 34 may be arranged on the straight line, and a position of at least one of the plurality of adjusting screws 34 may be deviated from the straight line of a rest of the plurality of the adjusting screws 34. In the embodiment illustrated in FIG. 6A, the holding mechanism for the long length optical element has the three-point adjusting mechanism, and a position of a center adjusting screw in the three-point mechanism is deviated from a line connecting with a center position of both sides of the three-point adjusting mechanism. By adopting a structure like the above, in the perspective view, FIG. 4A, corresponding to FIG. 6A, if three of the flat springs 31-1 to 31-3 on an incident surface side are in the same shape and three of the flat springs 32-1 to 32-3 on an emission surface side are also in the same shape, it is possible to avoid the twisted deformation of the second scanning lens 15-2. Moreover, a pressing force of the three of the flat springs 31-1 to 31-3 on the incident surface side and a pressing force of the flat springs 32-1 to 32-3 on the emission surface side may vary from each other.

Figure 6B:
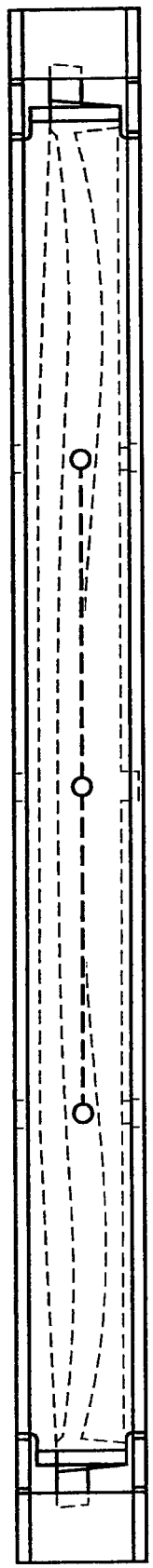
FIG. 6B illustrates the example of the arrangement of the three-point supporting mechanism of the holding mechanism for the long length optical element having the three-point supporting mechanism, and is a plain view illustrating a comparative example.

On the other hand, in a case of a structure of a comparative example illustrated in FIG. 6B, where the adjusting screws 34 are arranged on a straight line, to avoid an occurrence of the twisted deformation, it is necessary to vary points of action of the flat springs 31-1, 31-2, 31-3, 32-1, 32-2 and 32-3. Accordingly, the structure of the comparative example is not preferable, since a need to design flat springs having different shapes from each other occurs, and thereby higher parts cost and more complicated parts control may be caused.

NUMERIC VALUE EXAMPLES

Figure 13:
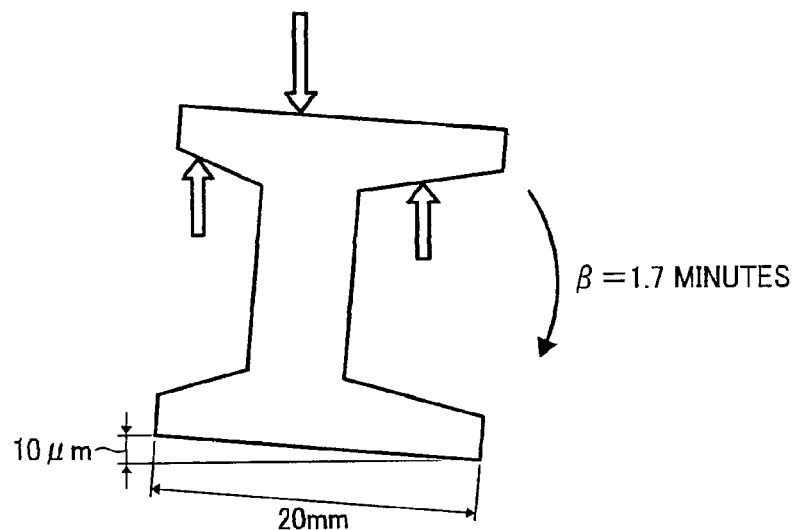
FIG. 13 is a side view illustrating an example of using numeric values to explain a variation of a scanning line position to a tilt of the scanning lens as the long length optical element of the optical scanning device.
Figure 14A:
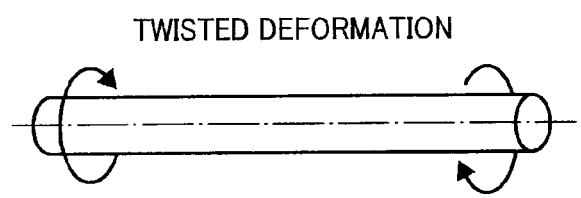
FIG. 14A illustrates a twisted deformation of the long length optical element.
Figure 14B:
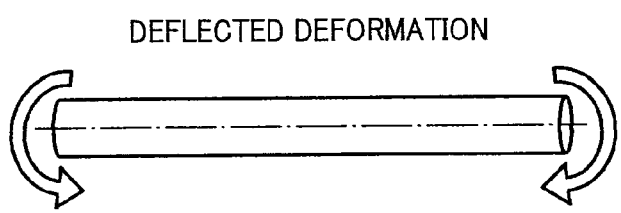
FIG. 14B illustrates a deflected deformation of the long length optical element.

A scanning optical system of an examination object, that is, an optical system from an optical deflector to a scanned surface, as an optical element having a power, is structured with a first scanning lens and a second scanning lens. The first scanning lens does not have a power in a sub-scanning direction and the power in the sub-scanning direction is distributed to only the second scanning lens. The scanning optical system is a magnifying optical system (magnification: about 1.5× magnification) in regard to the sub-scanning direction. In this optical system, as illustrated in FIG. 13, in a case where a center part of the second scanning lens deforms in a twisted manner at β=1.7 minutes, this optical system has the power in the sub-scanning direction which shifts a position of a scanning line at a center image height by about 50 μm in regard to a position where it should be. Here, as a premise, other optical elements are in ideal states without a shape error and an attachment error.

Figure 12A:
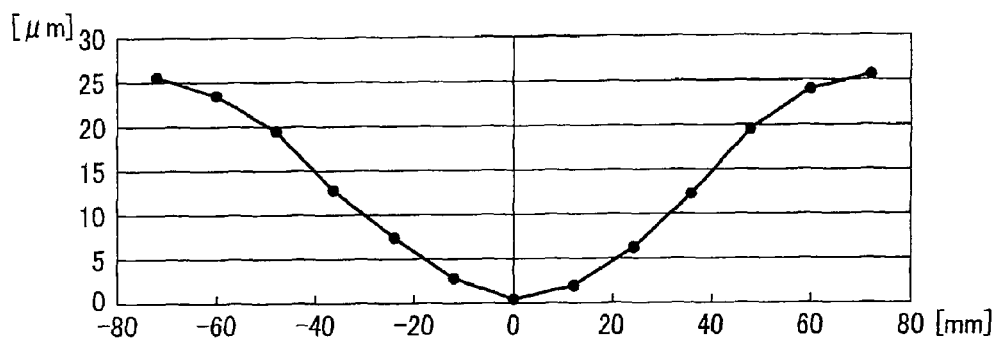
FIG. 12A illustrates a simulation result of the scanning optical system, and is a graph illustrating a shape example of a curve of a generatrix of the long length optical element.
Figure 12B:
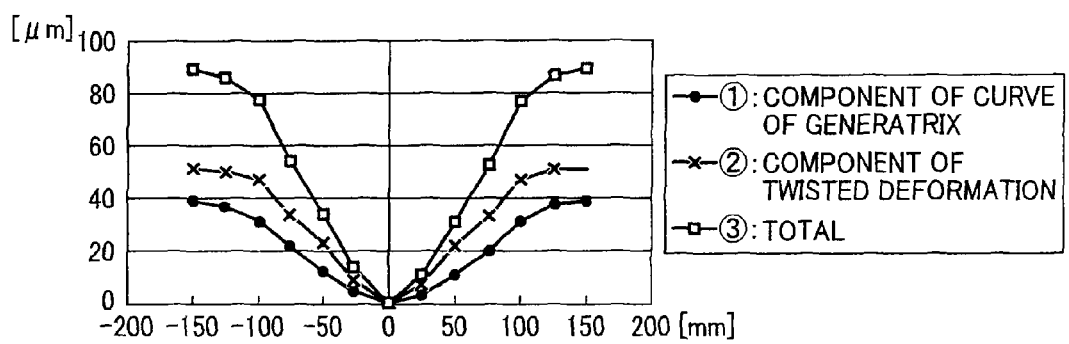
FIG. 12B illustrates a simulation result of the scanning optical system, and is a graph illustrating an example where the curve of the generatrix is enlarged on the scanned surface.

A result of a simulation of the scanning optical system described above will be described below. By an influence of fluctuations and so on during a forming of the second scanning lens, in a case where a shape of a curve of a generatrix (i.e. focal line) as illustrated in FIG. 12A is formed, on the scanned surface, the curve of the generatrix is enlarged and a shape of a curve line 1 illustrated in FIG. 12B is displayed. This corresponds to a setting state of the long length optical element illustrated in FIG. 9 where a twisted deformation does not occur when assembling. On the other hand, at the center part of the second scanning lens, if the twisted deformation illustrated in FIG. 10A or FIG. 10B occurs, by an influence of the twisted deformation, on the scanned surface, the curve of the scanning line having a shape illustrated by a curve line 2 in FIG. 12B is added. As a result, at the time of assembling, a shape of the scanning line becomes a curve line 3 illustrated in FIG. 12B.

Figure 12C:
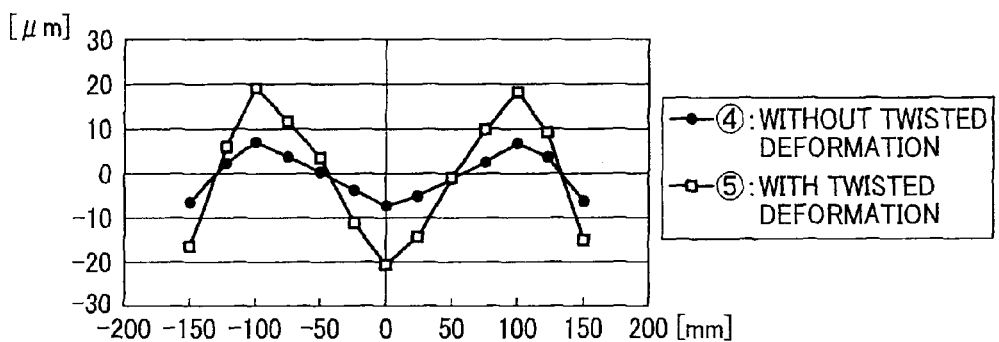
FIG. 12C illustrates a simulation result of the scanning optical system, and is a graph illustrating a result of correcting the curve of the generatrix.

A case where the second scanning lens is not deformed in the twisted manner, that is, a case of the curve line 1 in FIG. 12B, and a case where the second scanning lens is deformed in the twisted manner, that is, a case of the curve line 3 in FIG. 12B, are taken as initial states respectively. A deflection adjustment is performed respectively by pressing-into or pulling-out of an adjusting screw. A result of correcting the curve of the scanning line is illustrated in FIG. 12C.

Sizes of curves of scanning lines after a correction respectively are:

14 μm (a curve line 4 in FIG. 12C) in the case where the second scanning lens is not deformed in the twisted manner, and 39 μm (a curve line 5 in FIG. 12C) in the case where the second scanning lens is deformed in the twisted manner. As a result, in a case where the second scanning lens is set in a state where the twisted deformation occurs, after the adjustment, the curve of the scanning line remains larger, compared with the case where the second scanning lens is not deformed in the twisted manner.

The holding mechanism for the long length optical element explained above, as illustrated in FIG. 1, is applicable as one of the long length optical elements, for example, a holding mechanism of the second scanning lens 15-2 in an optical scanning device, in which a luminous flux emitted from a semiconductor laser 11, which is a light source, is deflected by a polygon mirror 14, which is an optical deflector, and a deflected luminous flux is led to a scanned surface 16 via a scanning optical system provided with a first scanning lens 15-1 and a second scanning lens 15-2, which are the long length optical elements.

Additionally, as illustrated in FIG. 2, in an image forming device in which electrophotographic processes including charging, exposure, developing, transferring, and fixing processes are performed to form an image on a photoreceptor drum, the optical scanning device described above is applicable as a device which performs the exposure process described above.

According to the holding mechanism for the long length optical element of an embodiment of the present invention, a holding member provided with "an adjusting section" which is capable of adjusting a shape of the long length optical element further includes "a spring section" which resists a displacement by "a pressing section", so that "the adjusting section" can adjust "a deflected shape" of the long length optical element. In addition, spring sections are provided respectively on a front side and a back side in an optical axis direction of the long length optical element, so that the long length optical element can be held stably.

In the holding mechanism for the long length optical element described above, the long length optical element is deflected in a sub-scanning direction and a tilt (β tilt) in a sub-scanning cross section is controlled, so that an occurrence of "a twisted deformation" can be avoided and an occurrence of a curve of a scanning line can be avoided. In addition, it is possible for a sensitivity of an adjustment of a curve of the scanning line by a deflected deformation of the long length optical element to avoid becoming too high.

In the holding mechanism for the long length optical element described above, a position in the optical axis direction of the adjusting section is arranged shift-wise in accordance with a change of a cross-sectional shape of the long length optical element in a longitudinal direction, that is, a structure in which the adjusting section is not arranged on a straight line is adopted, so that an occurrence of "the twisted deformation" can be avoided.

In the holding mechanism for the long length optical element described above, even if the pressing section is arranged on a straight line, pressing forces at the front surface side and the back surface side of the spring section provided respectively at the front surface and the back surface of the long length optical element are varied from each other in accordance with a change of the cross-sectional shape in the longitudinal direction of the long length optical element, so that an occurrence of "the twisted deformation" can be avoided, even if the same shape of the spring section is used.

A structure of the holding member is that the holding member holds the long length optical element near both ends in a main scanning direction, so that the long length optical element can be reliably fixed on the holding member in a region out of an effective range of the long length optical element.

An optical scanning device according to an embodiment of the present invention is equipped with the holding mechanism for the long length optical element described above as a holding mechanism for a long length optical element including its scanning optical system, so that an optical scanning device in which the curve of the scanning line on a scanned surface is small can be provided. Additionally, in a case where the optical scanning device has a plurality of scanned surfaces, a deviation of the curve of the scanning line among scanned surfaces can be reduced.

An image forming device according to an embodiment of the present invention is equipped with the optical scanning device described above as a device which performs an exposure process in an image forming device, so that a high-quality output image with less "color shifts" can be obtained.

Although, the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A holding mechanism for a long length optical element, which extends in a main scanning direction that is a movement direction of a deflected luminous flux by an optical deflector, and leads the deflected luminous flux to a scanned surface, comprising:
    a holding member which is, placed in a sub-scanning direction orthogonal to the main scanning direction and holds the long length optical element in at least two places,
    the holding member including: an adjusting section which deflects the long length optical element in the sub-scanning direction and controls a tilt of the long length optical element in a sub-scanning cross-section or occurrences of a twisted deformation.

2. The holding mechanism according to claim 1, wherein the adjusting section comprises: at least one pressing section which presses the long length optical element in the sub-scanning direction, and at least one spring section which resists a displacement by pressing of the pressing section.

3. The holding mechanism according to claim 2, wherein the adjusting section has a plurality of the pressing sections, and the pressing sections except for at least one of the plurality of the pressing sections are placed on a straight line which extends along the main scanning direction.

4. The holding mechanism according to claim 2, wherein the spring section is respectively placed on both sides of the long length optical element in an optical axis direction, and a pressing force of the spring section which is placed on one side of the optical axis direction and a pressing force of the spring section which is placed on the other side are respectively different.

5. The holding mechanism according to claim 1, wherein the long length optical element is held near both ends thereof in the main scanning direction by the holding member.

6. An optical scanning device, comprising:

a light source section;

an optical deflector which deflects a luminous flux emitted from the light source section; and a scanning optical system having a long length optical element and configured to lead a deflected luminous flux to a scanned surface, and wherein the long length optical element is held by a holding mechanism, which extends in a main scanning direction that is a movement direction of the deflected luminous flux by the optical deflector, and leads the deflected luminous flux to the scanned surface, and wherein the holding mechanism comprises:

a holding member which is placed in a sub-scanning direction orthogonal to the main scanning direction and holds the long length optical element in at least two places, the holding member including: an adjusting section which deflects the long length optical element in the sub-scanning direction and controls a tilt of the long length optical element in a sub-scanning cross-section or occurrences of a twisted deformation.

7. An image forming device, which forms an image by performing electrophotographic processes including charging, exposure, developing, transferring, and fixing processes onto a photoreceptor drum, comprising: the optical scanning device according to claim 6 as a device which performs the exposure process.

* * * * *